Mar. 6, 1923.

S. V. JOHNSON 1,447,309

CALCULATING DEVICE

Filed Sept. 4, 1918

S. V. JOHNSON

CALCULATING DEVICE

Filed Sept. 4, 1918

Inventor
Samuel V. Johnson
By
Lacey & Lacey, Attorneys

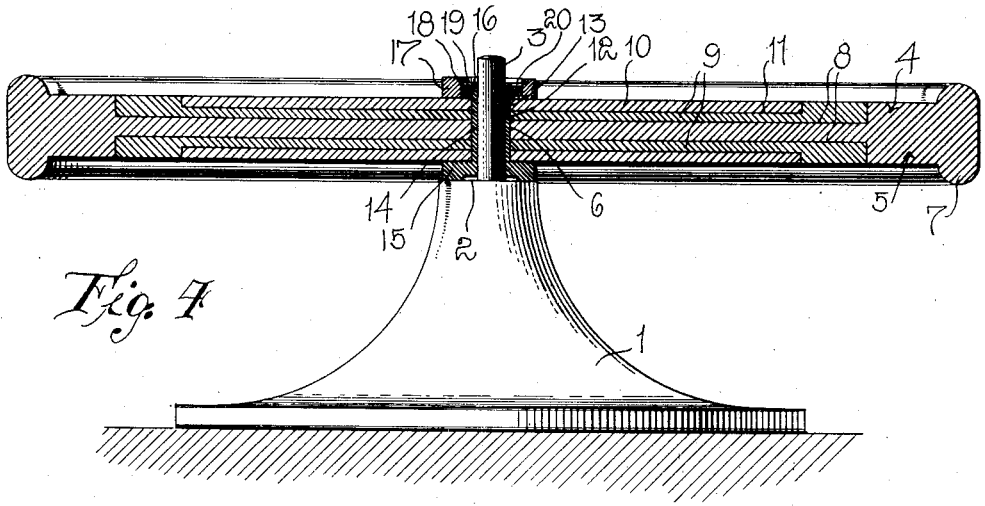

Patented Mar. 6, 1923.

1,447,309

UNITED STATES PATENT OFFICE.

SAMUEL V. JOHNSON, OF PORTLAND, OREGON.

CALCULATING DEVICE.

Application filed September 4, 1918. Serial No. 252,651.

*To all whom it may concern:*

Be it known that I, SAMUEL V. JOHNSON, a citizen of the United States, residing at Portland, in the county of Multnomah, State of Oregon, have invented certain new and useful Improvements in Calculating Devices, of which the following is a specification.

This invention relates to calculating devices and more particularly to a device for calculating periods of time which have elapsed or which will elapse between any two given dates, and the primary object of the present invention is to provide a device for this purpose which will be simple and compact in its construction and will eliminate all necessity of mathematical calculations in arriving at the desired results.

A further object of the invention is to provide a calculating device by the use of which may be determined the exact number of interest days between any two dates in any twelve month period; the number of days an account is overdue, taking into consideration and automatically deducting any future dating that has been given; and, the day of the week on which any date falls, the device constituting also a calendar for twelve months preceding any date and for twelve months succeeding any date, a monthly calendar for any year, and a calendar for any twelve consecutive months.

Another object of the invention is to provide a calculating device which, although it embodies relatively movable indicia bearing members, does not require manipulation of these members in arriving at any number of desired results in a day's use, but which on the other hand will be set once every day and after having been set may be employed throughout that day without further adjustment of its parts.

A further object of the invention is to provide a time period calculating device which will cause no confusion in its use during leap years as distinguished from ordinary years.

Another object of the invention is to provide a calculating device for the purpose stated whose data are all upon a rotary head and wherein rotation may be accomplished by the use of one hand, thus leaving the other hand free for writing or other work.

In the accompanying drawings:

Fig. 2 is a detail plan view of a portion of the obverse face of the rotary head of the device illustrating the arrangement of the indicia for ordinary years;

Fig. 3 is a similar view illustrating the other or reverse face of the said head and the arrangement of the indicia for leap years;

Fig. 4 is a vertical diametrical sectional view through the device;

Fig. 5 is a plan view of a table forming a part of the device;

Fig. 6 is a similar view illustrating another table forming a part of the device.

Figure 1:
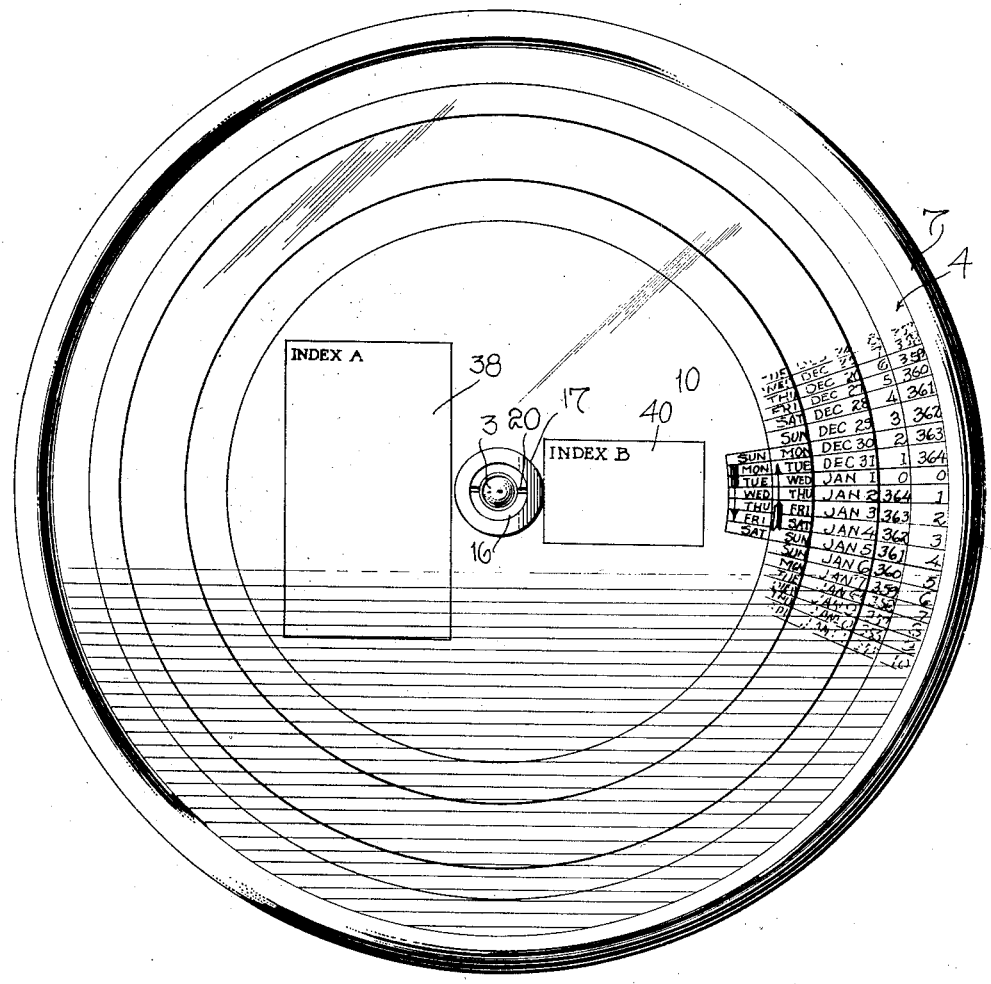
Figure 1 is a plan view of the device embodying the present invention.

Structurally the device comprises a pedestal and a head. The former includes a base 1 which is provided at its top with a smooth bearing surface 2 upon which there is provided an upstanding spindle 3 to which the rotary head 4 of the device is to be fitted. Said head 4 comprises a circular member or body 5 formed axially with an opening 6 and provided at its periphery with a bead 7 which may be grasped for the purpose of rotating the said member, as will be presently explained. Also this member is recessed in its upper and under faces, as indicated by the numeral 8. The head further includes month members in the form of major disks 9 of a diameter substantially the same as the diameter of the recesses 8 and these disks are fitted within the recesses 8 in the opposite faces of the body 5, the disks 9 having flat faces resting against the inner walls of the respective recesses 8. The head further includes week members in the form of minor disks 10 which are rotatably fitted in recesses 11 formed in the respective disks 9, and the said disks 9 and 10 are formed respectively with concentric openings 12 and 13. The depth of the recesses 8 and 11 is such that the upper faces of the disks 9 at their peripheries, the upper faces of the respective disks 10, and the upper face of the body 5 at the periphery thereof will all occupy a common plane. In order that said three members 5, 9 and 10 may be held assembled for rotary adjustment and that the head as a whole may be supported for rotation upon the spindle 3, a bolt preferably of the construction shown in Fig. 4 of the drawings is provided, and this bolt comprises a tubular shank 14 provided at one end with a head 15 having a flat outer face which may rest upon the bearing face 2 of the base 1 when the shank of the bolt is fitted over the spindle as shown in the said figure of the drawings. At its other end the bolt is exteriorly threaded as indicated by the numeral 16 and fitted onto this end is a washer 17 recessed in its outer face as indicated by the numeral 18 to receive a lock nut 19 which is threaded onto the said end of the shank and which may be suitably tightened to bind the assembled parts between the head of the bolt and the washer 17 and thus obtain the desired frictional contact between the parts to permit of their relative adjustment and yet provide against loss of said adjustment through too free rotation of the said parts. The said nut is preferably provided in its outer face with notches 20 whereby a spanner wrench may be applied to it for its adjustment.

By reference to Fig. 4 of the drawings it will be understood that the device is to be supported with the head in horizontal position and that consequently one face will be presented upwardly in plain view of the user seated at a desk or table upon which is device is disposed. It will also be evident that the head may be inverted by lifting it off the spindle 3, turning it upside down and again fitting it to its spindle. The device is thus constructed in order that one face thereof may bear indicia for use in ordinary years and the other face indicia for use in leap-years. A portion 21 of the first mentioned or obverse face of the rotary head is illustrated in detail in Fig. 2 of the drawings, and a portion 22 of the other reverse face of the member is illustrated in detail in Fig. 3 of the drawings. Aside from an exception which will be presently explained, the two faces are identical and the arrangement of the indicia thereon is identical, and therefore a general description of the indicia upon one face will suffice for both, corresponding reference numerals being employed to designate like elements in both of Figs. 2 and 3 of the drawings. The obverse and reverse of the exposed peripheral portions of the body 5 are divided by radial lines 23 respectively into three-hundred and sixty-five and three-hundred and sixty-six equal divisions 24, and each face is further divided medially by a circular line 25 concentric to the axis of the body, separating the divisions 24 into two concentric series of spaces 26 and 27. The numeral 0 is printed in corresponding radial spaces 26 and 27 upon each face of the body 5, and, beginning with the next adjacent space, the numerals 1 to 364 are printed on the obverse face in the remaining spaces of the series 26 and likewise in the remaining spaces 27, while numerals ranging from 1 to 365 are similarly provided on the reverse face. Thus the two sets of numerals in the two series of spaces upon the obverse face of the body 5 range from 0 to one less than the maximum number of days in the ordinary year and the numerals are, of course, arranged consecutively. Likewise in the instance of the other or reverse face of the body 5 the two sets of numerals range consecutively from 0 to one less than the total number of days in a leap-year. In the instance of each face of the body 5, the two sets of numerals extend in numerical order in opposite directions from the zero numerals so that for example the numeral 1 of each set will be radially opposite the numeral 364 or the numeral 365 as the case may be, of the other respective set.

The faces of the major disks 9 exposed at the obverse and reverse faces 21 and 22 of the head are divided by radial lines 28 into three-hundred and sixty-five and three-hundred and sixty-six divisions respectively and these faces of the said disks are further divided medially by a circular line 29 so that the divisions are separated into two series of spaces, the spaces of one series being indicated by the numeral 30 and the spaces of the other series being indicated by the numeral 31. Each face of the disk has printed within its spaces 30 month names or abbreviations thereof, and within the spaces 31, month dates. Beginning with corresponding radial spaces 30 and 31 having printed therein respectively "Jan." and "1." The thirty succeeding spaces 30 will have the same month designation printed therein and the thirty succeeding spaces 31 will have printed therein the numerals "2" to "31" ranging consecutively, and this order is continued throughout the twelve months of the year. The face of the other reverse disk 9 is similarly printed except that one set of the spaces 30 and 31 will bear the date designations Feb. and "29" as clearly shown in Fig. 3. Thus the face of each disk 9 bears, in radial divisions, indicia designating each day of each month in the year. The faces of the minor disks 10 exposed respectively at the obverse and reverse faces 21 and 22 of the head are divided by radial lines 32 respectively into three-hundred and sixty-five and three-hundred and sixty-six divisions and in each of these divisions there is printed the name of a day of the week or an abbreviation thereof. Thus beginning with one of the divisions bearing the week day designation Sun., the succeeding six divisions will bear the week day names Mon., Tues., Wed., Thurs., Fri., and Sat. in successive order, this arrangement being continued throughout the desired number of divisions in the instance of the said disks 10. For a purpose to be presently explained, the face of the disk 10 which is exposed at the obverse 21 of the head has printed thereon a block 33 of seven divisions arranged close to and opposite seven of the divisions in the series bearing the week day names, and these divisions of the block 33 have printed in them the week day names Sun., Mon., Tues., Wed., Thurs., Fri., and Sat., opposite corresponding divisions bearing week day names Mon. to and including Sun., respectively. The face of the disk 10 which is presented at the reverse face 22 of the head likewise has printed thereon a block 34 of seven divisions bearing week day names ranging chronologically from Sun. to Sat., both inclusive, but in this instance the week day name Sun. in the respective division of the block 34 appears opposite the week day name Tues. in the first mentioned series of divisions. Also for a purpose to be presently explained, arrows 35 and 36 are printed upon the exposed face of each disk 10, in the one case within the series 32 and block 33 and in the other case within the series 32 and block 34, these arrows pointing in opposite directions.

For a purpose which will be presently pointed out, the zero numerals heretofore referred to as being located within the spaces 26 and 27, are printed in red, and likewise the numerals 10, 15, 20, 30, 60 anl 90 wherever they occur in the spaces 27 are printed in red. Also where the month date 31 occurs in the spaces 31, the numeral "1" of this date is printed in red and the minus sign is also printed in red after this said numeral. Also in the space bearing the month date 28 relating to the month of Feb., there is printed in red the numeral "2" followed by the plus sign, and in the space containing the month date 29 relative to the month of Feb. in a leap-year on the reverse face 22 of the rotary member, there is printed in red the numeral "1" followed by the plus sign. Furthermore wherever the week day name Sun. appears this name is printed in red, and also all of the week day names in the divisions 32 opposite the blocks 33 and 34 at the faces 21 and 22 respectively are printed in red.

As an adjunct to the structure previously described, there are printed upon the face of each of the disks 10, two tables such as shown in Figs. 5 and 6 of the drawings. The table shown in Fig. 5 is designed for use in determining the day of the week for the first day in any year in the Gregoran calendar. The table embodies an arrangement of week day names in columns and horizontal lines, as indicated by the numeral 37, and above each of these columns 37 there is arranged a column of numerals 38 which indicate years in terms of even hundreds. Beside the columns 37 there are printed columns 39 of numerals ranging consecutively from 1 to 100 and arranged in the manner illustrated in the said figure. In fact, as the arrangement of the week day names and numerals is clearly illustrated in the figure it is thought that further description thereof is unnecessary. In order that the table may be employed in arriving at results for leap-years as well as for ordinary years, certain selected week day names 37 are printed in red or indicated by an asterisk or other designating symbol either as found desirable, these especially designated week days bearing direct relation to leap-years. With the exception that a horizontal line of the week day names in the columns 37 constitutes an odd line and occurs opposite the numeral 100 in the columns 39, the numerals in the said columns 39 designate fractions of hundreds of years. As an illustration of the manner of using this table, let it be assumed that it is desired to ascertain on what day of the week Jan. 1, 1918 fell. In arriving at this result, the numeral 19 designating nineteen hundred years in the columns of numerals 38 is first located and the numeral 18 designating eighteen hundredths years is located in the columns of numerals 39 and at the intersection of these columns we find the week day name Tues. which is the day of the week upon which Jan. 1, 1918 fell.

The table shown in Fig. 6 of the drawings is to be employed in determining the day of the week upon which the first of each month in any year will fall, when the day of the week which is the first day of any month in that year, is known. This table comprises seven columns 40 of week day names, the columns being so arranged that they will form seven horizontal lines of week day names, each column and each line including chronologically occurring week days. This table also includes horizontal lines 41 of month names arranged as illustrated in the said figure and located opposite or in alignment with the horizontal lines of week day names 40. As an example of the use of this table let it be assumed that it is known that the first day of July 1919 will fall on Tues. and it is desired to ascertain upon what days of the week the first of every other month of the said year 1919 will fall. The week day name Tues. is first located in the columns 40 in line with the month name July in the lines of names 41. The week day names in the column 40 in which Tues. is thus found, will indicate the week days upon which will fall the first of each month given in the corresponding horizontal lines. Certain of the month names are either printed in red or designated by an asterisk or other symbol, these names being duplicate of the same names appearing in black elsewhere in the group of month names and relating to leap-years. These tables shown in Figs. 5 and 6 of the drawings, are useful not only in a general way for arriving at the results stated but they possess particular value when employed in conjunction with the device illustrated in Figs. 2 and 3 of the drawings, for by their use, should the person using the device not know upon what day of the week Jan. 1st of the preceding year fell or Jan. 1st of a succeeding year will fall, he may readily ascertain this fact by reference to the tables shown in Fig. 5 and, either by combined use of the tables shown in Figs. 5 and 6 or by use of the table shown in Fig. 6 alone, he may determine upon what day of the week the first of any month of any year will fall when, in the latter instance, he knows the week day upon which the first of some other month of that year will fall, and thus he is enabled to set or adjust the elements of the calculating device shown more particularly in Figs. 2 and 3.

The following is an explanation of the various uses of the device. Let it be assumed that the device is to be used in the year 1918. If it is known that Jan. 1, 1918 fell on Tues, the use of the table shown in Fig. 5 is unnecessary, but if this fact is not known, reference is made to this table. The fact being known or having been ascertained that it being also known that 1918 is not leap-year the head is positioned with its obverse face 21 uppermost and the upwardly presented disks 9 and 10 are relatively adjusted or one of these disks alone may be adjusted so that the week day name Tues. in the block 33 will be opposite the legend Jan. 1 upon the month disk 9. So long as these disks do not have their adjustment disturbed, they will constitute a complete calendar for the year stated, and reference may be had to any date by merely rotating the entire head about its spindle. Should it be desired to adapt the device to serve as a calendar for the preceding year (1917) the said disks 9 and 10 are so adjusted that the week day name Monday in the block 32 opposite the divisions 33 will be located in radial alignment with the legend Jan. 1. This same general mode of adjustment holds true with regard to the use of the device as a calendar for a leap-year except that the arrangement of the block 34 with relation to the divisions 32 varies, in the respect previously stated, from the arrangement of the block 33 with respect to the divisions 32.

The use of the device is the same for leap-years as for ordinary years except that the reverse face 22 of the head is employed for leap-years instead of the obverse face 21. The disk 9 is first rotatably adjusted until the current date is opposite the zero position of the series of figures denoting the days of the year, and the disk 10 is similarly adjusted until the day of the week identifying the current date is opposite the current date upon the disk 9. Thus if the device is to be employed in the year 1918 and its use is begun on Jan. 1, the space bearing the week day name Tues. in the block 33 will be brought opposite Jan. 1 in the series 30 and 31, and likewise Jan. 1 will be brought opposite the zero upon the disk 5. With the three members thus set, the total number of days between the current date and any succeeding or preceding date may be instantly determined by reference in the first instance to the figures in the outer series of spaces 27 and in the second instance to the figures in the inner series of spaces 26. In other words, for computation to succeeding dates read downward as per arrow 36, and for computation to preceding dates read upward as per arrow 35. It is manifest that when January 1 is set opposite the block, dates in the future will be in one year and dates in the past in another year, and the arrows are placed along side the days which must respectively be set opposite January 1, according to the year into which the computation extends. If time is to be determined in monthly periods of thirty days each, there will be subtracted from the total number of days the number of thirty-first days occurring between the current date; and the future or preceding date and on the other hand there will be added the number of plus days indicated in the Feb. 28, or Feb. 29 space depending upon whether the device is being employed in an ordinary year or in a leap-year.

The device is particularly useful where it is frequently necessary to calculate time on over-due invoices on which a certain dating was given. Thus if an account due thirty days after the given date is over-due, the person using the device will set the outer disk so that the red numeral 30 in spaces 27 will occupy the position previously occupied by the zero position of the said disk and in this manner the device will automatically subtract thirty days from the result.

It will be understood that changes may be made so long as the same fall within the scope of the claim.

Having thus described the invention, what is claimed as new is:

In a calculating device, inner, outer and intermediate members relatively rotatable and each having an exposed face portion, the outer member having its said face portions divided by radial lines into a number of equal divisions corresponding to the total number of days in a year, and also bearing, in said spaces, two concentric series of ordinals ranging from zero, in opposite directions, to the ordinal expressive of the last day of the year, the exposed face portion of the intermediate member being divided by radial lines into a number of equal divisions each designated to represent a specific day of a particular month and the designations being arranged chronologically, the inner member having its exposed face divided by radial lines into equal divisions totalling in number the number of days in a year and chronologically designated to represent the days of successive weeks, the said inner member also bearing upon its face a series of seven radial spaces located beside and in radial alinement with seven of the first-mentioned division spaces of the said inner member and designated chronologically to represent the days of a week, the seven week day designations in the last-mentioned series of spaces being arranged in non-corresponding order, by one day, with relation to the seven first-mentioned spaces, in alinement with which they are positioned.

In testimony whereof I affix my signature.

SAMUEL V. JOHNSON. [L. S.]